United States Patent
Skirmont (12)

(10) Patent No.: US 6,252,848 B1
(45) Date of Patent: Jun. 26, 2001

(54) SYSTEM PERFORMANCE IN A DATA NETWORK THROUGH QUEUE MANAGEMENT BASED ON INGRESS RATE MONITORING

(75) Inventor: David A. Skirmont, Redwood City, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/273,847

(22) Filed: Mar. 22, 1999

(51) Int. Cl.[7] .................................................. G01R 31/08
(52) U.S. Cl. .............................................. 370/229; 714/26
(58) Field of Search ........................... 370/465, 234–236, 370/400, 253, 342, 229, 395, 232–235, 474; 375/142; 714/20–26, 47, 57; 709/103, 228, 229; 345/965, 418

(56) References Cited

U.S. PATENT DOCUMENTS

| | | | |
|---|---|---|---|
| 4,769,810 | 9/1988 | Eckberg, Jr. et al. | 370/232 |
| 4,769,811 | 9/1988 | Eckberg, Jr. et al. | 370/236 |
| 5,506,955 * | 4/1996 | Chen et al. | 714/26 |
| 5,748,901 * | 5/1998 | Afek et al. | 370/229 |
| 6,157,955 * | 12/2000 | Narad et al. | 709/228 |

FOREIGN PATENT DOCUMENTS

| | | |
|---|---|---|
| 0275 679 | 7/1988 | (EP) . |
| WO 99/00949 | 1/1999 | (WO) . |

OTHER PUBLICATIONS

Floyd, S. and Jacobson, V.; "Random Early Detection Gateways for Congestion Avoidance," IEEE Inc., New York, vol. 1, No. 4, Aug. 1, 1993, pp. 397–413.

Basu, A.; Wang, Z.; "A Comparative Study of Schemes for Differentiated Services," IETF Website.

Lin, D.; Morris, R.; "Dynamics of Random Early Detection," Proc. of SIGCOMM '97.

Feng, W.; Kandlur, D.D.; Saha, D.; Shin, K.G.; "A Self-–Configuring RED Gateway," found on the Internet.

Floyd, S.; Jacobson, V.; "Random Early Detection Gateways for Congestion Avoidance," Aug. 1993 IEEE/ACM Transactions on Networking.

\* cited by examiner

Primary Examiner—Wellington Chin
Assistant Examiner—Prenell Jones
(74) Attorney, Agent, or Firm—Pillsbury Winthrop, LLP.

(57) ABSTRACT

A method optimizes performance in a data network including a plurality of ingress ports and output queues. Ingress rates of a plurality of flows are monitored, where each flow includes a sequence of packets passing from an ingress port to an output queue and each flow has a profile related to flow characteristics. Each packet is marked with a marking based on criteria including the ingress flow rate and the flow profile. A drop probability of each packet is adjusted at an output queue according to a value of a drop function taken as a function of a queue size. The drop function is selected according to the marking on the packet. The drop functions are zero for queue sizes less than a lower threshold range and positive for queue sizes greater than the lower threshold range. By selecting drop functions according to ingress flow rate measurements and flow profiles, the data network can be optimized for overall system performance.

31 Claims, 7 Drawing Sheets

SYSTEM PERFORMANCE IN A DATA NETWORK THROUGH QUEUE MANAGEMENT BASED ON INGRESS RATE MONITORING

BACKGROUND OF THE INVENTION

1. Field of Invention

The present invention relates to the design of a data network and more particularly to a method for optimizing system performance in a data network through ingress rate monitoring.

2. Description of Related Art

A flow of data entering a network is routed to a designated queue while other flows are simultaneously routed to their designated queues. A queue can build up (i.e., congest) when the egress rate is less than the ingress rate for that queue. This congestion can lead to poor performance for the underlying tasks. Therefore, the efficient management of congestion is an important goal in the design of a data network.

As illustrated in FIG. 6, a representative data network includes data channels C1'–C3', which take as inputs data from the Flows F1'–F9'. The channels pass data to a switch S', which in turn passes the data to Queues Q1'–Q3'.

The data in each of flows F1'·F9' consists of a sequence of packets (i.e., units of data). The packets corresponding to a given flow (i.e., one of F1'–F9') pass through a designated channel (i.e., one of C1'–C3') and are routed by Switch S' to a designated queue (i.e., one of Q1'–Q3–).

When the network becomes congested, packets can be dropped due to a lack of resources. Dropped packets must then be resent. This places an additional load on the system that can lead to further congestion.

A packet is dropped according to the RED algorithm (Random Early Detection) in the packet's corresponding queue (i.e., one of Q1'–Q3'). As illustrated by the drop probability curve in FIG. 7, the probability of dropping a packet is set to zero for values of the average queue size less than a lower RED threshold value and is set to one for values greater than an upper RED threshold value. For values of the average queue size in between the two thresholds, the drop probability depends linearly on the average queue size. Once the drop probability of a packet is determined, then the packet may or may not be dropped according to a random test; otherwise, the packet is enqueued. Details of the RED Algorithm are given in "Random Early Detection Gateways for Congestion Avoidance"(Sally Floyd and Van Jacobson, 1993 IEEE/ACM Transactions on Networking), incorporated herein by reference.

The dropping of packets effectively signals congestion in a data network to a higher-level protocol such as TCP, and the higher-level protocol then responds by slowing down the rate of the corresponding flow. When there is no congestion (i.e., no dropping of packets), the higher-level protocol naturally increases the overall traffic in the network until congestion occurs. While the use of RED to signal congestion has some advantages, this approach still can lead to limitations in system performance, which can be characterized by measures such as throughput (i.e., the total amount of data transferred) and goodput (i.e., the amount of data transferred completed tasks).

Because the RED algorithm allows the dropping of packets without regard to the characteristics of a flow, packets may be dropped in a flow that is critical for system performance but is not responsible for congestion in the system. Thus, for example, the RED algorithm does not distinguish between a high-bandwidth flow related to a file transfer and a low-bandwidth flow related to a control signal. In a qualitative sense, the overall performance of the system will benefit by increasing drop probabilities for flows that are causing the congestion.

Attempts to modify the RED algorithm have generally focussed on additional inputs other than ingress measurements and performance criteria other than and system performance.

For example, the FRED algorithm (Flow Random Early Drop) modifies the drop probability according to the RED algorithm by incorporating information on buffer use (i.e., queue usage) so that packets of a flow with high buffer use are more likely to be dropped. The FRED algorithm makes this modification by maintaining per-active-flow buffer counts for each flow that currently has packets buffered. Details of the FRED algorithm are discussed in "Dynamics of Random Early Detection" (Dong Lin and Robert Morris, Proceedings of SIGCOMM'97).

The Adaptive RED algorithm employs a drop probability curve according to the RED algorithm, where the curve can be modified according to some system performance goal; however, flow characteristics and measurements are not used. Details of the Adaptive RED algorithm are discussed in "A Self-Configuring RED Gateway" (Feng et al.).

The WRED algorithm (Weighted Random Early Detection) uses the IP precedence of a packet to modify the drop probability without regard to the flow. That is, a different drop probability curve as in FIG. 7 is used for each IP precedence (from 1 to 8). As a result, one cannot expect improved system performance. A variant of the WRED algorithm also employs different drop probability curves at each queue.

Other approaches have focussed on preferences for certain users. That is, a flow owned by a preferred user can have a drop probability curve with lower values as compared with a curve associated with a non-preferred user. As a result, flows belonging to a preferred user may be benefited, but system performance is not likely to be enhanced. For example, the two-bit scheme allocates a higher-priority queue to a preferred user. Similarly the USD scheme allocates higher bandwidth to a preferred user. The RIO scheme includes two drop probability curves, one for flows "in profile" and one for flows "out of profile" with respect to some flow characterization based in part on the user. The "in profile" curve uses a higher value for the lower RED threshold as compared with the "out of profile" curve. As a result, packets may be dropped for flows that are "out of profile" while the congestion in the system is being caused by flows that are "in profile." Preferences based primarily on user identification cannot be expected to enhance system performance. Details of the two-bit scheme, the USD scheme and the RIO scheme are discussed in "A Comparative Study of Schemes for Differentiated Services" (Anindya Basu and Zheng Wang, IETF Website).

Other non-probabilistic approaches to dropping packets have also been developed. Examples include U.S. Pat. No. 4,769,810 and U.S. Pat. No. 4,769,811. However, for some applications these approaches appear to be less successful in signaling congestion in a data network.

SUMMARY OF THE INVENTION

Accordingly, it is an object of this invention to provide a method for optimizing performance in a data network.

It is a further object of this invention to provide a method for optimizing performance in a data network using ingress flow measurements.

It is a further object of this invention to provide a method for optimizing performance in a data network where the optimization criterion is based on system performance.

It is a further object of this invention to provide a method for marking packets of flows according to a comparison of ingress flow measurements and flow profiles.

It is a further object of the invention to provide a method for selecting drop probability functions according to the marking of a packet.

It is a further object of the invention to provide a method for selecting the drop probability of a packet according to the average queue size of the queue and the marking of a packet.

The above and related objects of the present invention are realized by a method for optimizing performance in a data network including a plurality of ingress ports and output queues. Ingress rates of a plurality of flows are monitored, each flow including a plurality of packets passing from an ingress port to an output queue, each flow having a profile related to flow characteristics. Each packet is marked with one of a plurality of flow markings based on criteria including the ingress rate and the flow profile. A drop probability of each packet is adjusted at an output queue according to a value of a drop function taken as a function of a queue size, the drop function being selected from a plurality of drop functions, each drop function being associated with one of the plurality of markings. The drop functions are zero for queue sizes less than a lower threshold value range, and drop functions are uniformly positive for queue sizes greater than the lower threshold value range. This range, which may consist of a single point, can be adjusted according to performance goals.

The present invention advantageously allows optimization of system performance goals by measuring flow characteristics and comparing these characteristics against flow profiles to determine the likelihood of dropping packets. A flexible framework allows consideration of multiple criteria and measurements. Communication to a higher-level protocol is thereby beneficially enhanced.

These and other objects and advantages of the invention will become more apparent and more readily appreciated from the following detailed description of the presently preferred exemplary embodiments of the invention taken in conjunction with the accompanying drawings.

BRIEF DESCRIPTION OF THE DRAWINGS

FIGS. 5A–5C, shows plots of measurable flow characteristics associated with monitoring ingress flow;

DETAILED DESCRIPTION OF THE PRESENTLY PREFERRED

Exemplary Embodiment

Figure 1:
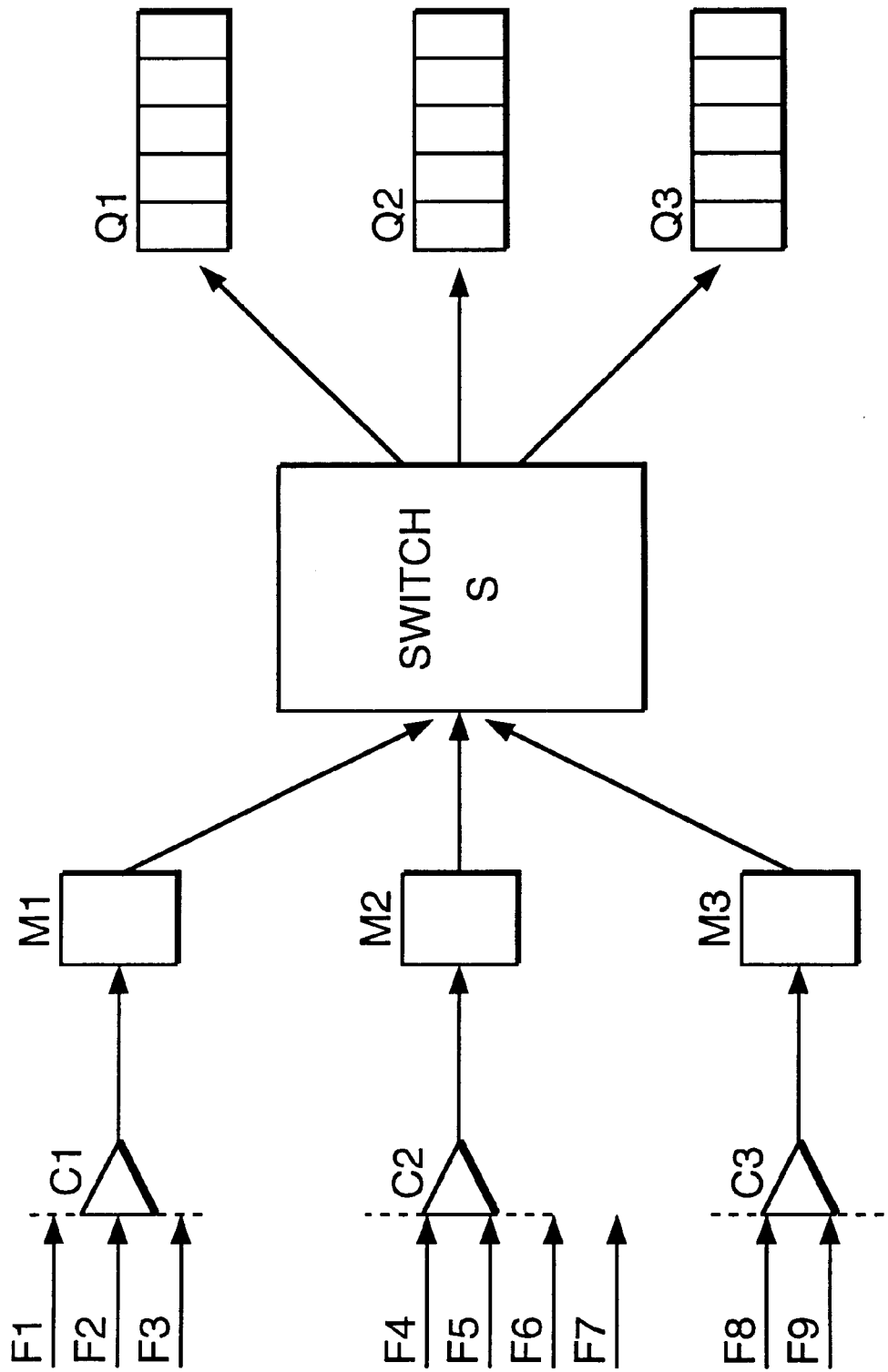
FIG. 1 is a data flow diagram in accordance with the present invention.

As shown in FIG. 1, a preferred embodiment of a method for optimizing performance in a data network in accordance with the present invention includes data channels C1–C3, which take as inputs data from the Flows F1–F9. The channels pass data through traffic monitors M1–M3, to a switch S, which in turn passes the data to Queues Q1–Q3. The numbers of flows, channels, monitors, switches, and queues are not restricted. The embodiment is presented here with illustrative numbers of components.

The data in each of flows F1–F9 comprises a sequence of packets (i.e., units of data). The packets corresponding to a given flow (i.e., one of F1–F9) pass through a designated channel (i.e., one of C1–C3), through a designated traffic monitor (i.e., one of M1–M3), and are routed by Switch S to a designated queue (i.e., one of Q1–Q3). As part of the process control, each packet is marked in the corresponding traffic monitor through which the packet passes (i.e., one of M1–M3). Preferably a designated bit of a packet can be used to indicate the marking. A marking can be based on measurements taken at the traffic monitor as well as other data including a flow profile associated with each of flows F1–F9. In a preferred embodiment the flow profile associated with a flow includes a lower threshold and an upper threshold for the bandwidth (i.e., average data rate), and a packet is marked as "LOW", "NORMAL", or "THIGH" according to whether the concurrently measured bandwidth is respectively below both thresholds, between the thresholds, or above both thresholds.

Figure 2:
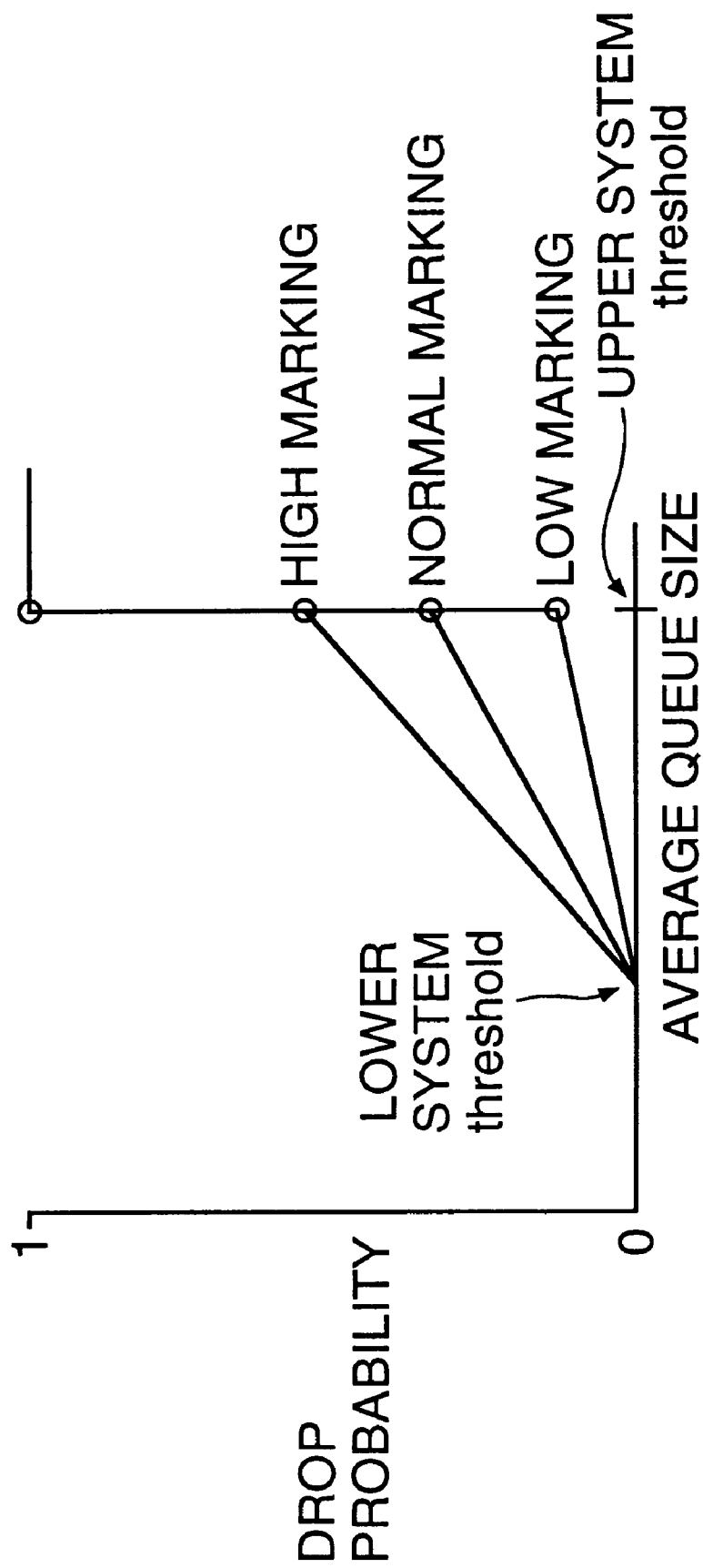
FIG. 2 is a plot of marking curves in accordance with the present invention.

According to the present invention, a packet is dropped in the packet's corresponding queue (i.e., one of Q1–Q3) based on an assigned drop probability and a random test. As illustrated in FIG. 2, in the preferred embodiment the probability of dropping a packet is assigned according to the average queue size and the marking of the packet, where for a packet marked as "HIGH", "NORMAL", or "LOW", the drop probability is determined from the corresponding marking curve. Once the drop probability of a packet is determined, then the packet may or may not be dropped according to a random test (i.e., generation of a random number); otherwise, the packet is enqueued.

Figure 3:
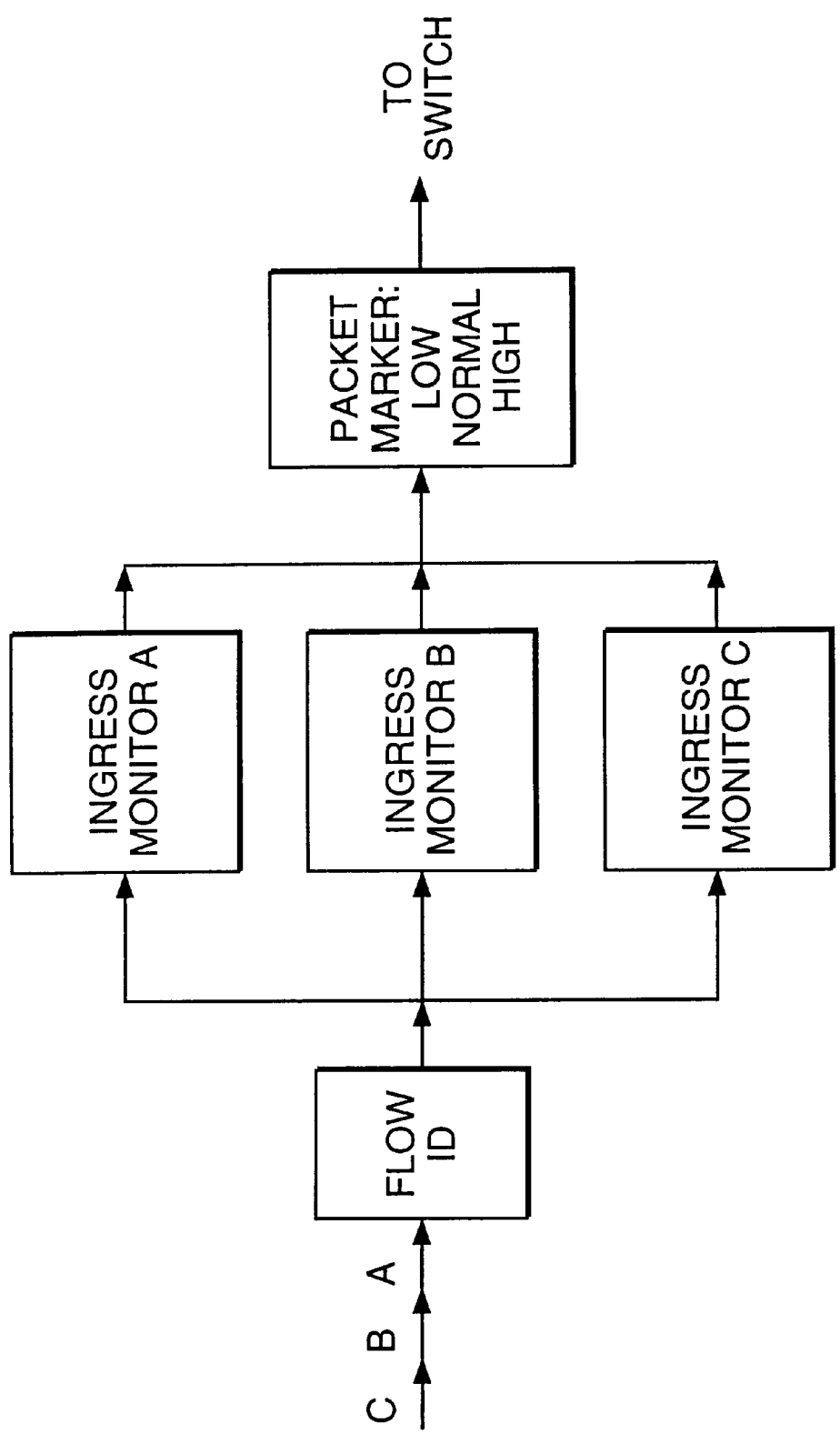
FIG. 3 is a traffic monitor in accordance with the present invention.

Each traffic monitor includes an ingress monitor for each flow associated with the channel. As illustrated in FIG. 3, a preferred embodiment of a traffic monitor includes a Flow ID function for identifying data packets from data flows A, B, and C. Packets are counted by (or passed through) an ingress monitor corresponding to the flow, then marked by the packet marker, and then passed to the switch S.

Figure 4:
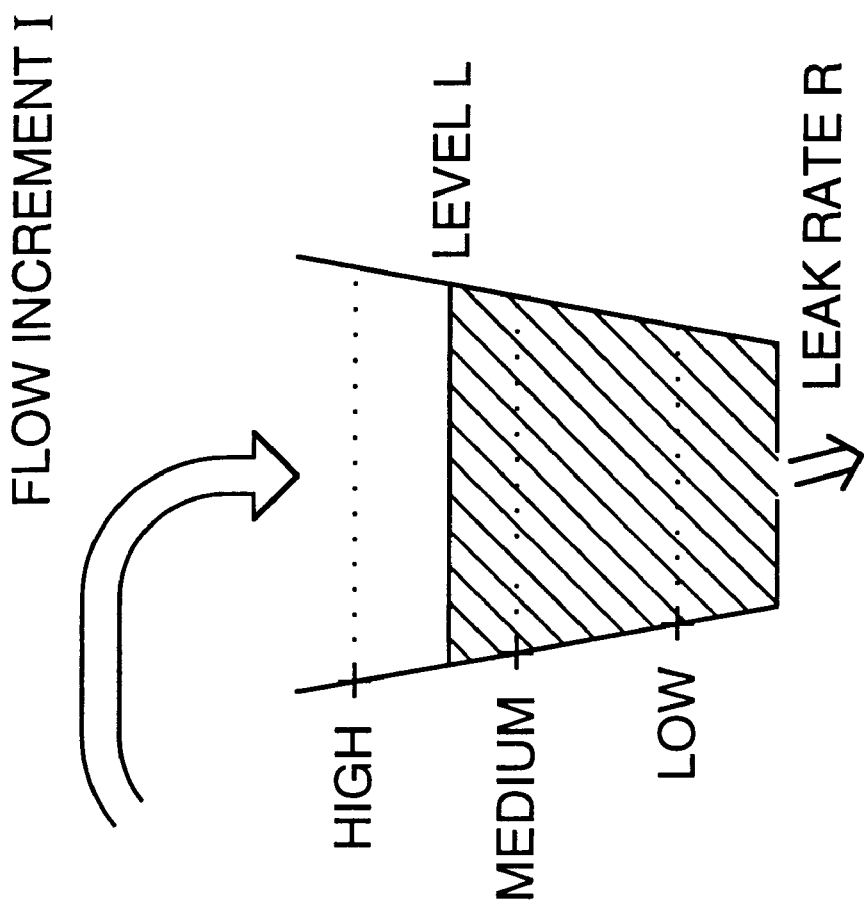
FIG. 4 is leaky-bucket model for a traffic monitor.
Figure 5:
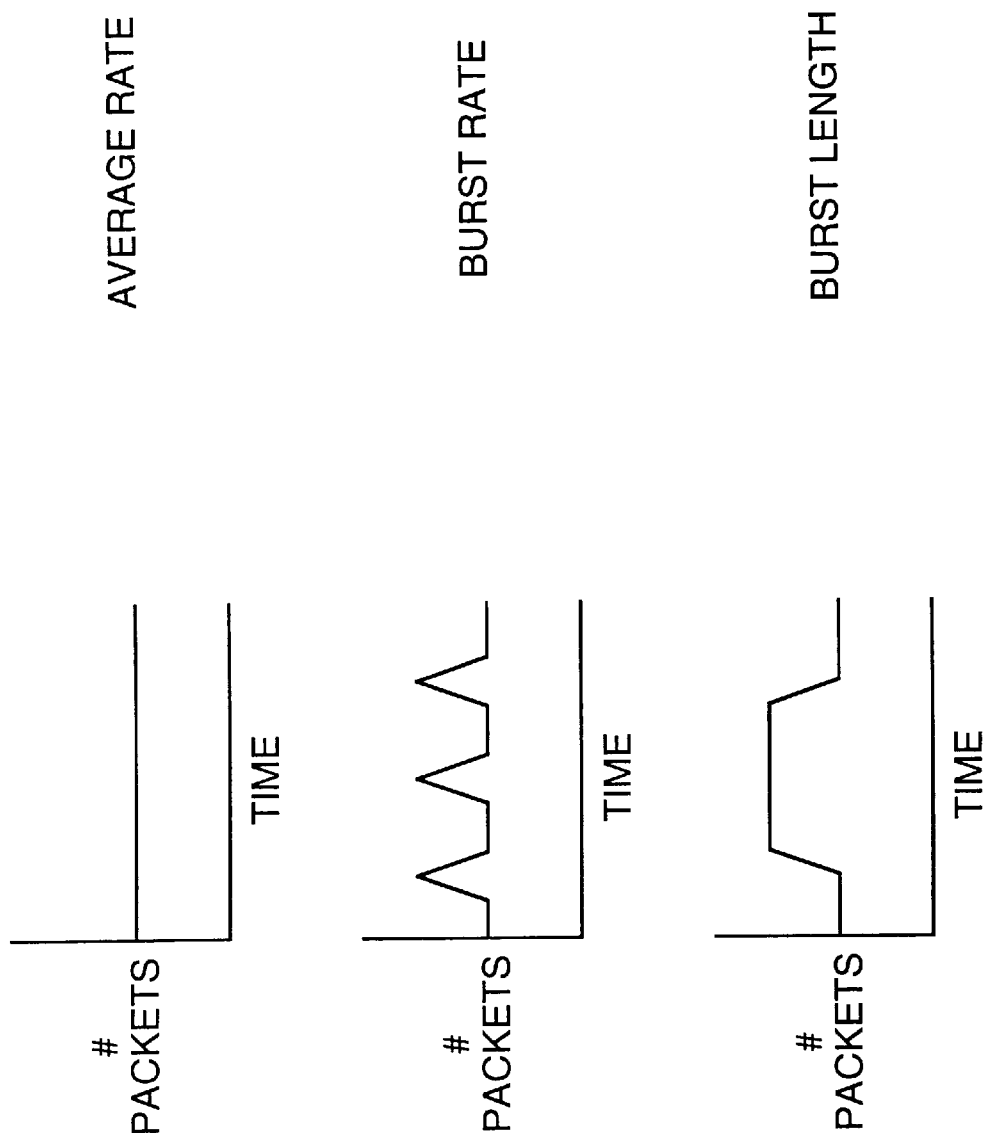
FIG. 5 comprising
Figure 6:
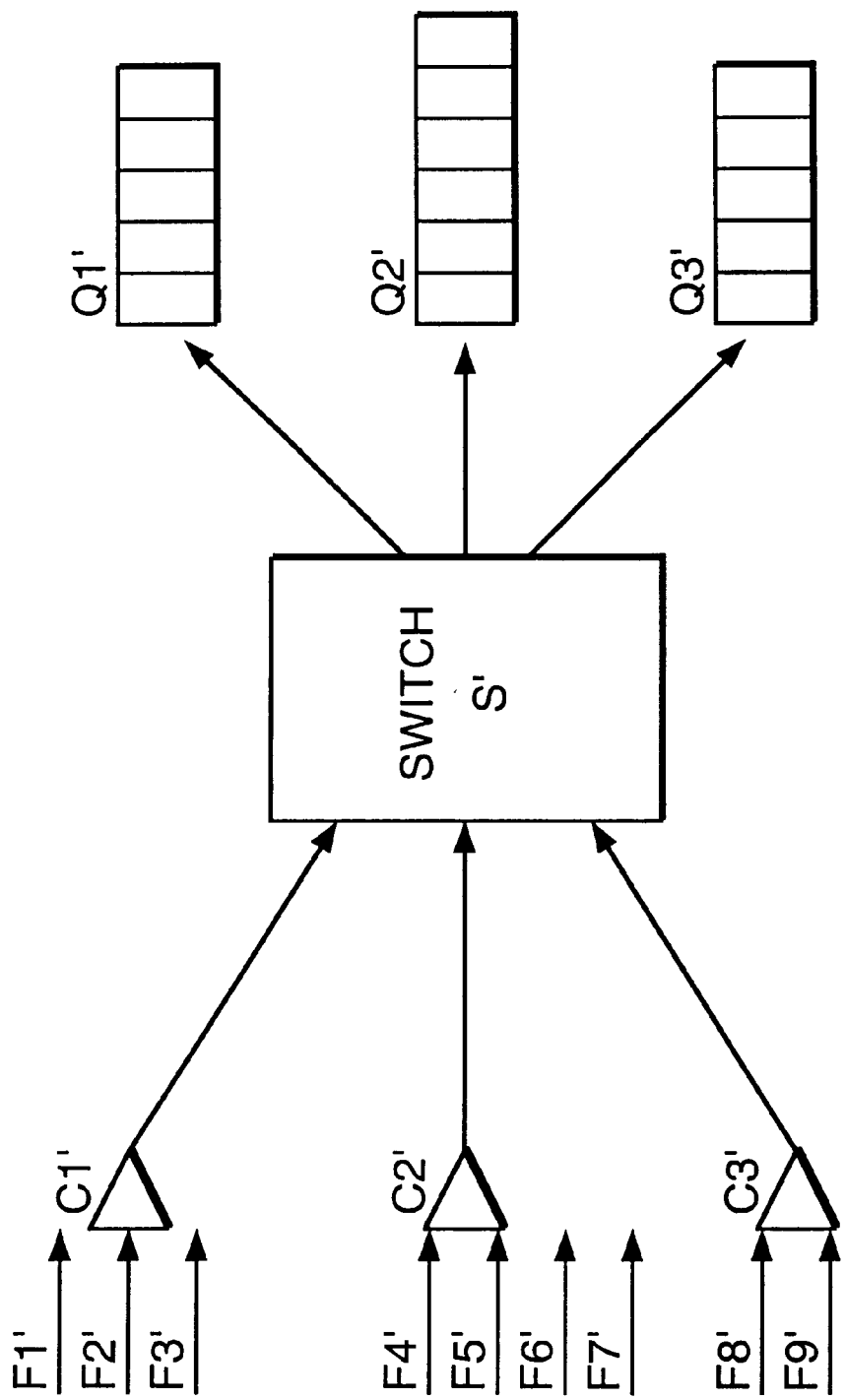
FIG. 6 is a data flow diagram.
Figure 7:
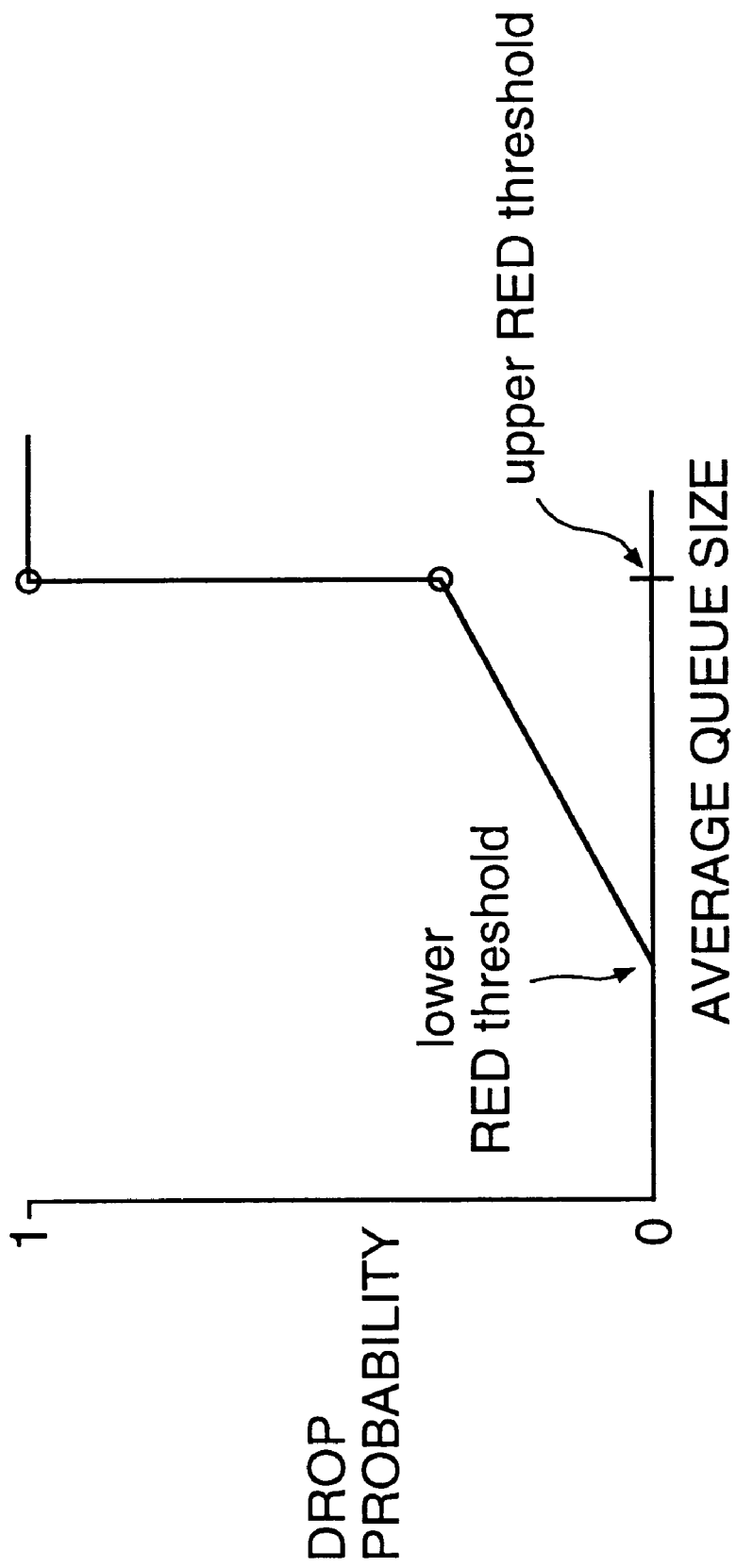
FIG. 7 is a plot illustrating the drop probability curve of the RED algorithm.

A preferred embodiment of an ingress monitor is known in the art as a leaky-bucket model. (As illustrated in FIG. 4, a preferred embodiment of the leaky-bucket model includes as characteristic parameters a flow increment I, a leak rate R, and a level L. As a packet is passed through the monitor, the level L is incremented by the flow increment I. The level L is also decremented at each cycle by the leak rate R. As illustrated in FIG. 5, such a model can be used to measure a number of flow characteristics including not only the average data rate but also the burst rate and the burst length. An ingress monitor may include multiple leaky-bucket models in order to capture these flow characteristics. Other models in a addition to the leaky-bucket model may be used as components of an ingress monitor. (ATM Forum Traffic Management Specification, Document No. af-tm-0056.000)

The present invention possesses a number of advantages.

A flow that conforms to its corresponding flow profile is considered well-behaved from a systems perspective. By measuring flow characteristics that can be compared against a flow profile to determine the likelihood of dropping packets, flows that are well-behaved can be assigned lower drop probabilities while flows that are not well-behaved can be assigned higher drop probabilities. As a result, system performance can be improved, as characterized by measures such as throughput (i.e., the total amount of data transferred) and goodput (i.e., the amount of data transferred for completed tasks).

The present invention presents a flexible framework for using multiple criteria based on flow profiles and measurable flow characteristics to determine the probability of dropping a packet. As illustrated in FIG. 5, multiple criteria can be used to determine the marking for a packet. For example, under some conditions the burst rate or burst length may be critical to system performance if a flow behaves in an erratic way. Flow profiles may indicate that some flows (e.g., control messages) should be assigned a low drop probability because of the criticality of data to other flows. Alternatively, some flows with high data rates may undesirably affect system performance without any justification from a systems perspective.

As discussed above, the dropping of packets effectively signals congestion in a data network to a higher-level protocol such as TCP, and the higher-level protocol then responds by slowing down the overall flow of data in the network. The RED algorithm allows the dropping of packets without regard to the characteristics of a flow, and so packets may be dropped in a flow that is critical for system performance but is not responsible for congestion in the system. By contrast, the present invention allows the system to adjust packet dropping for an individual flow based on its potential effect on system performance. Thus, communication to the higher-level protocol is enhanced.

As illustrated by FIG. 2, the preferred embodiment of the present invention has advantages based on the common thresholds and the piecewise-linear structure of the marking curves. Preferably, each of the marking curves gives a value of zero for the drop probability for average queue sizes less than a common threshold, denoted as the lower system threshold. Preferably, each of the curves gives a value of one for the drop probability for average queue sizes greater than a common threshold, denoted as the upper system threshold. Preferably, each of the curves is a linear function for average queue sizes between the lower system threshold and the upper system threshold, where the curve for "HIGH MARKING" lies above the curve for "NORMAL MARKING" and the curve for "NORMAL MARKING" lies above the curve for "LOW MARKING."

The use of common thresholds such as the lower system threshold and the upper system threshold may benefit system performance by simultaneously raising the drop probabilities for all flows from probability zero and simultaneously lowering the drop probabilities for all flows from probability one. Alternative methods without common thresholds may adversely affect system performance by allowing some flows to undermine system performance while other flows are exclusively penalized. Additionally, the common structural features of the marking curves have advantages for implementation. For values of the average queue size between the lower system threshold and the upper system threshold, a simple scaling allows one to calculate drop probabilities on any curve from knowledge of the drop probabilities on a single curve.

The structure of the marking curves in the preferred embodiment of FIG. 2 is not restrictive. Other embodiments of the present invention can be designed to benefit system performance. For example, the number of marking curves is not limited to three; any number can be employed based on the degree of optimization desired. Furthermore, a piecewise-linear structure is not required.

Additionally, not all marking curves need share a common lower threshold or a common upper threshold. For example, a lower threshold range of values may be desirable in some operational settings where such fine-tuned biasing is appropriate. A greater differentiation in the use of thresholds with the curves will result in a corresponding differentiation in the treatment of the packets. Factors that may be considered in this differentiation include: buffer capacity (i.e., maximum queue size), the number and speed of channel interfaces leading into a queue, the expected utilization of a queue, the measured utilization of channels, and the traffic profile of packets (e.g., burstiness, burst length, and peak rate).

A desirable lower threshold range can be determined from these factors and other system parameters. For example, the RED algorithm uses system parameters to determine a lower RED threshold $Q_{LR}$. The maximum average buffer size of the network is given by a parameter $Q_{max}$. Then a desirable lower threshold range $(Q_{L1}, Q_{L2})$ for optimizing system performance has a smallest value $Q_{L1}$ equal to 20% to 60% of $Q_{RL}$ and a largest value $Q_{12}$ equal to $Q_{LR}$ plus 20% to 60% of $(Q_{max}-Q_{LR})$. Similarly, a desirable upper threshold range can be obtained from the upper RED threshold $Q_{UR}$ and the maximum average buffer size $Q_{max}$. Then a desirable upper threshold range $(Q_{U1}, Q_{U2})$ for optimizing system performance, has a smallest value $Q_{U1}$ equal to 20% to 60% of $Q_{UR}$ and a largest value $Q_{U2}$ equal to $Q_{UR}$ plus 20% to 60% of $(Q_{max}-Q_{UR})$ These system parameters may also be considered in other phases of the design process according to the present invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed:

1. A method for optimizing performance in a data network including a plurality of ingress ports and output queues, each of the plurality of ingress ports receiving packets from a plurality of flows, comprising the steps of:
  monitoring ingress rates of a plurality of flows, each flow including a plurality of packets passing from an ingress port to an output queue, each flow having a profile related to flow characteristics;
  marking each packet with one of a plurality of flow markings based on criteria including the ingress rate and the flow profile;
  adjusting a drop probability of each packet at an output queue, according to a value of a drop function taken as a function of a queue size, the drop function being selected from a plurality of drop functions, each drop function being associated with one of the plurality of markings, wherein
  the drop functions are zero for queue sizes less than a lower threshold range, and
  the drop functions are positive for queue sizes greater than the lower threshold range.

2. The method of claim 1, wherein
  the lower threshold range has a smallest value that is greater than 60% of a lower RED threshold value, and
  the lower threshold range has a largest value that is less than the sum of 40% of the lower RED threshold value and 60% of a maximum average buffer size of the network.

3. The method of claim 1, wherein
  the lower threshold range has a smallest value that is greater than 20% of a lower RED threshold value, and the lower threshold range has a largest value that is less than the sum of 80% of the lower RED threshold value and 20% of a maximum average buffer size of the network.

4. The method of claim 1, wherein the lower threshold range consists of a lower threshold value.

5. The method of claim 1, wherein
the drop functions are uniformly one for queue sizes greater than an upper threshold range.

6. The method of claim 5, wherein
the lower threshold range has a smallest value that is greater than 60% of a lower RED threshold value,
the lower threshold range has a largest value that is less than the sum of 40% of the lower RED threshold value and 60% of a maximum average buffer size of the network,
the upper threshold range has a smallest value that is greater than 60% of an upper RED threshold value, and
the upper threshold range has a largest value that is less than the sum of 40% of the upper RED threshold value and 60% of the maximum average buffer size of the network.

7. The method of claim 5, wherein
the lower threshold range has a smallest value that is greater than 20% of a lower RED threshold value, and
the lower threshold range has a largest value that is less than the sum of 80% of the lower RED threshold value and 20% of a maximum average buffer size of the network.
the upper threshold range has a smallest value that is greater than 20% of an upper RED threshold value, and
the upper threshold range has a largest value that is less than the sum of 80% of the upper RED threshold value and 20% of the maximum average buffer size of the network.

8. The method of claim 5, wherein
the lower threshold range consists of a lower threshold value, and
the upper threshold range consists of an upper threshold value.

9. The method of claim 8, wherein the drop functions are linear functions for queue sizes between the upper threshold value and the lower threshold value.

10. The method of claim 1, wherein the drop functions are non-decreasing functions of queue size.

11. The method of claim 1, wherein the plurality of drop functions includes functions identified for "low marking", "normal marking", and "high marking."

12. The method of claim 1, wherein the flow profile includes an average rate, a burst rate and a burst length.

13. The method of claim 1, wherein the flow profile includes at least one of an average rate, a burst rate and a burst length.

14. The method of claim 1, wherein the monitoring of ingress rates includes a leaky-bucket algorithm.

15. A method for optimizing performance independently of user in a data network including a plurality of ingress ports and output queues, each of the plurality of ingress ports receiving packets from a plurality of flows, comprising the steps of:
monitoring ingress rates of a plurality of flows, each flow including a plurality of packets passing from an ingress port to an output queue, each flow having a profile related to flow characteristics;
marking each packet with one of a plurality of flow markings based on criteria including the ingress rate and the flow profile;
adjusting a drop probability of each packet at an output queue, according to a value of a drop function taken as a function of a queue size, the drop function being selected from a plurality of drop functions, each drop function being associated with one of the plurality of markings.

16. The method of claim 15, wherein the drop functions are zero for queue sizes less than a lower threshold value.

17. The method of claim 16, wherein the drop functions are one for queue sizes greater than an upper threshold value.

18. The method of claim 17, wherein the drop functions are linear functions for queue sizes between the upper threshold value and the lower threshold value.

19. The method of claim 15, wherein the drop functions are non-decreasing functions of queue size.

20. The method of claim 15, wherein the plurality of drop functions includes functions identified for "low marking", "normal marking", and "high marking."

21. The method of claim 15, wherein the flow profile includes an average rate, a burst rate and a burst length.

22. The method of claim 15, wherein the flow profile includes at least one of an average rate, a burst rate and a burst length.

23. The method of claim 15, wherein the monitoring of ingress rates includes a leaky-bucket algorithm.

24. A method for optimizing performance in a data network including a plurality of ingress ports and output queues, each of the plurality of ingress ports receiving packets from a plurality of flows, comprising the steps of:
monitoring ingress rates of a plurality of flows, each flow including a plurality of packets passing from an ingress port to an output queue, each flow having a profile related to flow characteristics;
marking each packet with one of a plurality of flow markings based on criteria including the ingress rate and the flow profile;
adjusting a drop probability of each packet at an output queue, according to a value of a drop function taken as a function of a queue size, the drop function being selected from a plurality of drop functions, each drop function being associated with one of the plurality of markings, the plurality of drop functions including functions identified for "low marking", "normal marking", and "high marking."

25. The method of claim 24, wherein the drop functions are zero for queue sizes less than a lower threshold value.

26. The method of claim 25, wherein the drop functions are one for queue sizes greater than an upper threshold value.

27. The method of claim 26, wherein the drop functions are linear functions for queue sizes between the upper threshold value and the lower threshold value.

28. The method of claim 24, wherein the drop functions are non-decreasing functions of queue size.

29. The method of claim 24, wherein the flow profile includes an average rate, a burst rate and a burst length.

30. The method of claim 24, wherein the flow profile includes at least one of an average rate, a burst rate and a burst length.

31. The method of claim 24, wherein the monitoring of ingress rates includes a leaky-bucket algorithm.

* * * * *